Patented Jan. 11, 1938

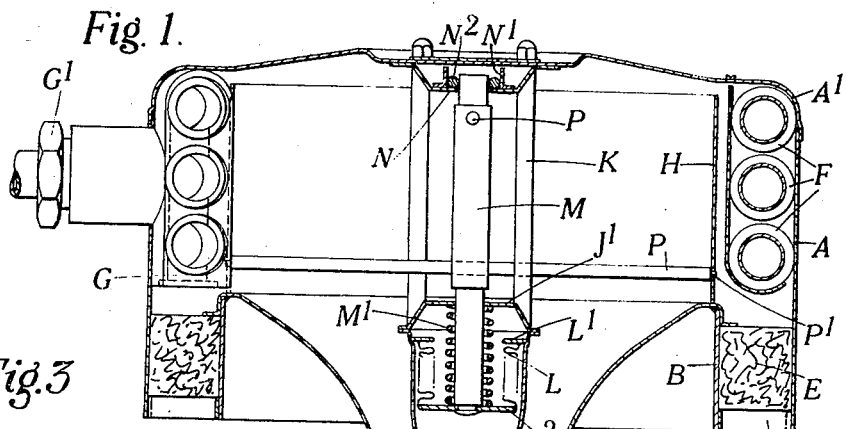
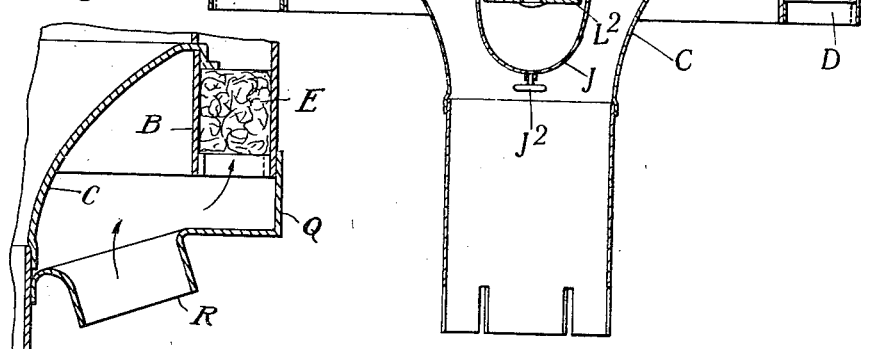
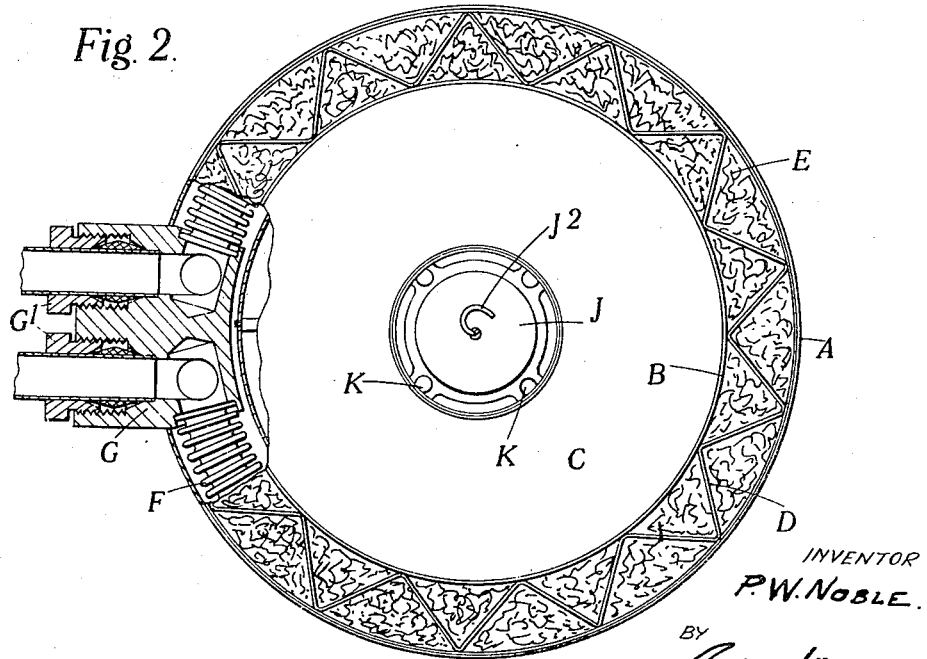

2,105,433

UNITED STATES PATENT OFFICE 2,105,433

DEVICE FOR CONDITIONING THE INTAKE AIR TO CARBURETORS

Percy Warren Noble, Unadilla, N. Y.

Application February 18, 1937, Serial No. 126,505
In Great Britain February 13, 1936

6 Claims. (Cl. 257—2)

This invention relates to a device for conditioning the air intake to a carburetor and has for its object to provide improved means for cleaning the air supplied to a carburetor and controlling its temperature to within predetermined limits.

It has been previously proposed to supply a mixture of separately induced cold air and air heated by exhaust gases and to employ thermostatic means responsive to the temperature of the mixture to control the proportions of hot and cold air to keep the temperature of the mixture within predetermined limits. In order that a substantially constant temperature may be achieved, however, it is obviously necessary for the supply of hot air to be sufficient in volume and temperature to satisfy the whole air requirements of the engine as soon as possible after starting, i. e. as soon as possible after heat from the exhaust gases is available.

For effecting the heating it has been proposed to employ casings or muffs about the exhaust pipe or to employ heat exchangers not unlike multi-tube boilers in which the exhaust gases pass through a large number of small tubes while the air for the carburetor flows over the external surfaces of these tubes.

In some cases the supply of cold air has been passed through a cleaner to remove suspended dust and dirt from it.

Owing to the many forms of exhaust manifolds and the different positions of the exhaust and inlet manifolds in relation to each other and the small differences in dimensions unavoidably occurring even in machines of the same series and design, the satisfactory employment of devices hitherto proposed has been difficult to achieve without special adaptation for each individual installation.

According to the present invention a device for conditioning the air intake to a carburetor comprises an air filter from which a part of the filtered air can flow direct to the carburetor whilst the remainder flows thereto past a heat exchanger heated for example by exhaust gases, and thermostatic means responsive to the temperature of the air mixture flowing to the carburetor and serving to control the proportion of the air which flows past the heat exchanger.

Preferably the heat exchanger, the thermostatic means and the filter are constructed as a self-contained unit which may be mounted on or adjacent the carburetor and to which the exhaust gases are tapped off and conveyed in pipes.

Thus the invention provides a device arranged to clean the entire volume of air whether hot or cold without employing unnecessarily large filters and the heater being part of the device may be readily connected to the exhaust manifold irrespective of the precise form and position thereof whilst the air for the carburetor can be supplied directly to the mixing chamber thereof.

The invention may be carried into effect in various ways but one specific embodiment thereof will be described by way of example with reference to the accompanying drawing, in which Figure 1 is a central vertical section through a combined air cleaner and heater, Figure 2 is an under plan of the heater with certain parts broken away, and Figure 3 is a detailed fragmentary sectional view showing an attachment.

The construction shown is intended to be applied to a carburetor having the air drawn in downwardly at the top. The device is mounted in a generally cylindrical casing A to which is soldered a slightly domed cover $A^1$. Within the lower part of the casing A a short cylinder or ring B is mounted concentrically so as to leave an annular space between it and the casing A. The upper edge of the ring B is soldered to a flared inlet pipe or horn C which is formed at its lower end to fit the air intake pipe of the carburetor. The short ring B is connected to the cylindrical casing A by suitable means, such as a metal strip D of zigzag form as shown in Figure 2 soldered alternately to the ring and the casing. Above the strip D is mounted an air cleaning layer E, for example of copper wool. It will be appreciated that the whole of the air entering the device and flowing into the carburetor through the horn C must pass through the annular filtering layer E.

Above the filter in the peripheral part of the casing is mounted an annular heat exchanger. Conveniently this consists of two or more corrugated tubes F bent so as to extend round the periphery of the cover inside it and terminating in a suitable junction block G. The latter passes through the wall of the casing and is provided with a pair of unions $G^1$ as shown in Figure 2, one for a pipe communicating with the exhaust manifold for admission of exhaust gases to the heat exchanger, and the other for disposal of the cooled exhaust gases to the atmosphere at a suitable point. Preferably the passages in the junction blocks are so arranged that the corrugated pipes are connected in parallel.

Above the ring B and level with the heat exchanger in the casing is a thermostatically controlled ring valve H. When the valve is in its lowermost position in contact with the outer edge of the horn C, the air from the filter is obliged to travel up outside the ring valve and therefore past the heat exchanger before flowing over the top of the ring valve into the middle part of the casing and thence down into the carburetor. On the other hand, when the valve is lifted air can pass between it and the partition into the middle part of the casing and hence flow into the carburetor without passing the heat exchanger.

It will be seen that the inlet for air into the device is of considerably greater cross-sectional area than the outlet for conditioned air to the carburetor and the air flows through the flared passageway or horn C from the larger to the smaller end. It is in fact found that with the arrangement shown the volumetric efficiency is actually greater than when the air flows straight into the carburetor without passing through a cleaner or heater at all.

The thermostatic control means for the valve comprises a metal cup J which is suspended by means of a number of bolts K from the cover. The cup is situated close to and in the middle of the horn and will therefore tend to take up the temperature of the air flowing to the carburetor. The form of mounting adopted avoids the use of any connection between the thermostat cup and the horn and thereby gives a clear passage for the air.

Within the cup J is a reentrant annular bellows L having its upper edge secured through a ring L¹ to the upper edge of the cup and having a rigid bottom L² from which a centre post M extends upwardly. The cup of the thermostat is provided with a cover J¹ having a central hole through which the centre post extends and by which it is guided, and also serving as an abutment for a coiled spring M¹ surrounding the centre post and pressing downwardly on the bottom of the annular bellows. The annular space outside the bellows and between it and the cup is filled with a substance which exerts a suitable vapour pressure at the temperatures in question. A pipe J² is shown for filling purposes.

The centre post is conveniently guided at its upper end by a bracket N secured to the cover and having a hole into which the centre post extends with some clearance. The bracket carries a sleeve N¹ and a ring N² of heat resisting rubber is interposed and rolls between the centre post and the sleeve so as to guide the centre post and prevent rattle. Alternatively a felt washer may be secured to the bracket for the same purpose.

The ring valve H is mounted on the centre post by means of a pair of diametrical spokes P mounted at right angles to one another, one near the lower edge of the ring valve and the other near its upper edge. These spokes are simply secured in diametrical holes through the centre post and have slightly reduced ends P¹ which project into corresponding holes in the ring valve. This provides a particularly neat and convenient arrangement since the ring valve can be very readily sprung into position over the spokes P which provide a neat, light and efficient self-centering arrangement.

As the temperature of the air flowing to the carburetor rises the cup and the liquid within it will be heated and the pressure on the bottom of the bellows will raise the ring valve and allow some of the air from the filter to flow beneath the ring valve and hence reach the carburetor without flowing past the heat exchanger.

It will be appreciated that the invention is not limited to the particular embodiment described by way of example. The particular construction described may be modified by surrounding the lower part of the casing with a hood Q having a pipe connection R through which air can be drawn from a particular point. This is especially desirable when the intake air is desired to be of a certain uniform or predetermined temperature unaffected by changes in temperature in the surrounding atmosphere. Again it is not essential that the device should be mounted on the carburetor although it is preferred that this should be so.

What I claim as my invention and desire to secure by Letters Patent is:—

1. A device for conditioning the air intake to a carburetor, comprising a tubular valve mounted to be movable longitudinally, an air filter and an outlet adapted to lead to the carburetor mounted so that air flowing from the filter can pass to the outlet round either end of the valve, a heat exchanger mounted so that air passing round one end of the valve will flow by it whilst air passing round the other end will not, and thermostatic means responsive to the temperature of the air mixture adjacent the outlet and serving to control the longitudinal movement of the valve to increase the proportion of air which flows past the heat exchanger as the temperature falls and vice versa.

2. A device for conditioning the air intake to a carburetor, comprising a tubular valve mounted to be movable longitudinally, an air filter, an outlet adapted to lead to the carburetor, a casing surrounding the valve and a heat exchanger in the annular space formed between the valve and the casing all arranged so that the air from the filter can flow to the outlet round one end of the valve past the heat exchanger and round the other end without passing the heat exchanger and thermostatic means responsive to the temperature of the air mixture adjacent the outlet and serving to control the longitudinal movement of the valve to increase the proportion of the air which flows past the heat exchanger as the temperature falls and vice versa.

3. A device for conditioning the air intake to a carburetor, comprising a tubular valve mounted to be movable longitudinally, an air filter, an outlet coaxial with the valve at one end thereof, a casing surrounding the valve and a heat exchanger in the annular space formed between the valve and the casing, all arranged so that air from the filter can flow to the outlet round one end of the valve past the heat exchanger and round the other end without passing the heat exchanger and thermostatic means situated adjacent the outlet and supported from a part of the casing at the opposite end of the valve.

4. A device for conditioning the air intake to a carburetor, comprising a tubular valve mounted by means of radial arms on a rod extending and movable along the axis of the valve, an air filter and an outlet adapted to lead to the carburetor, mounted so that air flowing from the filter can pass to the outlet round either end of the valve, a heat exchanger mounted so that air passing round one end of the valve will flow by it whilst air passing round the other end will not, and thermostatic means situated adjacent the axis of the valve and adjacent the outlet and controlling the movement of the said rod.

5. A device for conditioning the air intake to a carburetor, comprising an air filter, a heat exchanger comprising a plurality of corrugated pipes, an outlet adapted to lead to the carburetor and comprising a flared passageway through which air flows from the larger to the smaller end, means for causing a portion of the air from the filter to flow to the outlet past the heat exchanger whilst the remainder flows direct to the outlet and thermostatic means responsive to the temperature of the air mixture adjacent the outlet and serving to increase the proportion of air which flows past the heat exchanger as the temperature falls and vice versa.

6. A device for conditioning the air intake to a carburetor, comprising a tubular valve mounted to be movable longitudinally, an air filter having an air inlet and an outlet adapted to lead to the carburetor mounted so that air flowing from the filter can pass to the outlet round either end of the valve, a heat exchanger mounted so that air passing round one end of the valve will flow by it whilst air passing round the other end will not, thermostatic means responsive to the temperature of the air mixture adjacent the outlet and serving to control the longitudinal movement of the valve to increase the proportion of air which flows past the heat exchanger as the temperature falls and vice versa, and a hood about the inlet having a pipe connection through which air may be drawn from a particular point.

PERCY WARREN NOBLE.